(12) United States Patent
Stacey et al.

(10) Patent No.: US 9,152,628 B1
(45) Date of Patent: Oct. 6, 2015

(54) CREATING COPIES OF SPACE-REDUCED FILES IN A FILE SERVER HAVING A REDUNDANT DATA ELIMINATION STORE

(75) Inventors: Christopher H. Stacey, Christchurch (NZ); John T. Cardente, Milford, MA (US)

(73) Assignee: EMC Corporation, Hopkinton, MA (US)

(*) Notice: Subject to any disclaimer, the term of this patent is extended or adjusted under 35 U.S.C. 154(b) by 1964 days.

(21) Appl. No.: 12/236,466

(22) Filed: Sep. 23, 2008

(51) Int. Cl.
G06F 17/00 (2006.01)
G06F 17/30 (2006.01)

(52) U.S. Cl.
CPC ............................. G06F 17/30005 (2013.01)

(58) Field of Classification Search
CPC ............ G06F 17/30005; G06F 17/30123; G06F 17/30138; G06F 17/30147; G06F 17/3015; G06F 17/30156
USPC .................. 707/638, 641, 692, 695, 999.203
See application file for complete search history.

(56) References Cited

U.S. PATENT DOCUMENTS

| | | | |
|---|---|---|---|
| 5,893,140 A | 4/1999 | Vahalia et al. | |
| 6,145,012 A * | 11/2000 | Small | 709/246 |
| 6,324,581 B1 | 11/2001 | Xu et al. | |
| 6,353,878 B1 | 3/2002 | Dunham | |
| 6,389,433 B1 | 5/2002 | Bolosky et al. | |
| 6,477,544 B1 * | 11/2002 | Bolosky et al. | 1/1 |
| 6,529,909 B1 * | 3/2003 | Bowman-Amuah | 1/1 |
| 6,658,522 B1 | 12/2003 | Martin et al. | |
| 6,938,039 B1 * | 8/2005 | Bober et al. | 707/704 |
| 7,206,863 B1 | 4/2007 | Oliveira et al. | |
| 7,263,590 B1 | 8/2007 | Todd et al. | |
| 7,707,165 B1 * | 4/2010 | Jiang et al. | 707/806 |
| 2004/0139128 A1 | 7/2004 | Becker et al. | |
| 2005/0065986 A1 * | 3/2005 | Bixby et al. | 707/204 |
| 2005/0071390 A1 * | 3/2005 | Midgley et al. | 707/204 |
| 2006/0212481 A1 | 9/2006 | Stacey et al. | |
| 2006/0212746 A1 | 9/2006 | Amegadzie et al. | |
| 2007/0088702 A1 | 4/2007 | Fridella et al. | |
| 2007/0179934 A1 | 8/2007 | Basov et al. | |
| 2007/0179990 A1 | 8/2007 | Zimran et al. | |
| 2007/0266056 A1 | 11/2007 | Stacey et al. | |
| 2008/0005468 A1 | 1/2008 | Faibish et al. | |

(Continued)

OTHER PUBLICATIONS

Vahalia, Uresh, Unix Internals: The New Frontiers, 1996, p. 261-289 and 338-371, Prentice-Hall, Inc., Upper Saddle River, NJ.

(Continued)

*Primary Examiner* — Mohammed R Uddin
(74) *Attorney, Agent, or Firm* — Richard Auchterlonie; Novak Druce Connolly Bove + Quigg LLP

(57) ABSTRACT

A file server having a redundant data elimination store responds to requests from clients for copies of space-reduced files. For reduced storage requirements and reduced processing time, a baseline version of unshared data blocks is created in the file server, and then the baseline version is space reduced by conversion to a stub version of shared data blocks, and then the file server responds to a request from a client for creation of one or more space-reduced copies by cloning the stub version. The file server may also respond to a request for creation of a modified space-reduced copy having specified data written at a specified offset. For example, the file server creates a respective modified copy of a virtual server image file for use by each client of the file server.

9 Claims, 12 Drawing Sheets

(56) References Cited

U.S. PATENT DOCUMENTS

2008/0034268 A1* 2/2008 Dodd et al. .................. 714/755
2008/0162308 A1* 7/2008 Sharma .......................... 705/28
2009/0319534 A1* 12/2009 Gokhale ........................ 707/10

OTHER PUBLICATIONS

Nowicki, Bill, Network Working Group, RFC 1094, "NFS: Network File System Protocol Specification," Mar. 1989, 27 pages, Sun Microsystems, Inc., Santa Clara, CA.

NFS Protocol Sequence Diagram, Aug. 11, 2007, 3 pages, EventHelix.com Inc., Gaithersburg, MD.

Leach, Paul, and Naik, Dilip, "A Common Internet File System," Dec. 19, 1997, 121 pages, Microsoft Corporation, Redmond, WA.

XML-RPC Specification, XML-RPC.com, Aug. 23, 2003, 7 pages, UserLand Software, Inc., Danville, CA.

Bolowsky, William J., "Single Instance Storage in Windows® 2000," USENIX Technical Program, WinsSys, Aug. 3-4, 2000, Seattle, WA, 12 pages, USENIX, Berkeley, CA.

"VMware® ESX Server Platform for virtualizing servers, storage and networking," product datasheet, 2007, 4 pages, VMWARE, Inc., Palo Alto, CA.

Babineau, Brian, "Symantec Enterprise Vault and EMC Centera—Unlocking the Benefits of Efficient Information Archiving," Jan. 2007, 11 pages, Enterprise Strategy Group, Milford, MA.

Baltazar, Henry, "Microsoft's Single Instance Storage vs. Deduplication," Inside eWEEK Labs, eweek.com, Ziff Davis Internet, Woburn, MA Jan. 25, 2006, 3 pages.

Wendt, Jerome M., "Tech Report: Content-addressed storage preferred for fixed-content storage," Jun. 19, 2006, 5 pages, searchstorage.com, Needham, MA.

"Single Instance Store and SIS Backup," msdn2.microsoft.com, printed Jan. 25, 2007, 8 pages, Microsoft Corporation, Redmond, WA.

"Enginuity: The Symmetrix Storage Operating Environment," EMC White Paper, Jul. 2005, 22 pages, EMC Corporation, Hopkinton, MA.

"EMC Symmetrix DMX Architecture," Product Description Guide, Mar. 2004, 76 pages, EMC Corporation, Hopkinton, MA.

"Applying EMC OnCourse Technology in a Content Aggregation Scenario," May 6, 2003, 14 pages, EMC Corporation, Hopkinton, MA.

"Celerra Data Migration Service (CDMS)," White Paper, Jan. 2002, 14 pages, EMC Corporation, Hopkinton, MA.

"Information Lifecycle Management: An Automated Approach," Technical White Paper, Dec. 8, 2003, 20 pages, EMC Corporation, Hopkinton, MA.

"Automated Resource Management," Technology Brief—Aug. 2002, 3 pages, The Enterprise Storage Group, Milford, MA.

* cited by examiner

| 121 | 122 | 123 | 124 | 125 | 126 |
|---|---|---|---|---|---|
| USER_AGENT | SERVER_ID | RDE_COPY | SOURCE FILE_ID | TARGET DIRECTORY_ID | NEW FILE NAME |

FIG. 6 (120)

| 131 | 132 | 133 | 134 | 135 | 136 |
|---|---|---|---|---|---|
| USER_AGENT | SERVER_ID | RDE_COPYN | SOURCE FILE_ID | TARGET DIRECTORY_ID | N |

FIG. 7 (130)

| 141 | 142 | 143 | 144 | 145 | 146 | 147 | 148 |
|---|---|---|---|---|---|---|---|
| USER_AGENT | SERVER_ID | RDE_COPYW | SOURCE FILE_ID | TARGET DIRECTORY_ID | NEW FILE NAME | OFFSET | DATA |

FIG. 9 (140)

CREATING COPIES OF SPACE-REDUCED FILES IN A FILE SERVER HAVING A REDUNDANT DATA ELIMINATION STORE

FIELD OF THE INVENTION

The present invention relates to a file server having a redundant data elimination (RDE) store.

BACKGROUND OF THE INVENTION

In recent years there has been a problem of an increasing number of stored electronic documents that have identical or virtually identical content. For example, the Microsoft Outlook™ electronic mail system ordinarily results in multiple copies of an attachment being kept in data storage of a business enterprise when a document is sent by electronic mail to multiple recipients in the business enterprise.

In an attempt to solve the problem of multiple copies of a file being kept in a storage volume, Microsoft Corporation introduced a Single Instance Storage (SIS) feature in its Microsoft Windows® 2000 server. See William J. Bolosky, "Single Instance Storage in Windows® 2000," USENIX Technical Program, WinsSys, Aug. 3-4, 2000, Seattle, Wash., USENIX, Berkeley, Calif. SIS uses links to the duplicate file content and copy-on-close semantics upon these links. SIS is structured as a file system filter driver that implements the links and a user level service that detects duplicate files and reports them to the filter for conversion into links.

SIS, however, will not reduce the data storage requirements or performance degradation due to virtually identical files. For example, an E-mail application such as the Microsoft Outlook™ electronic mail system may produce virtually identical files in a business enterprise when an E-mail is sent to multiple recipients in the business enterprise.

Data de-duplication techniques similar to SIS have been developed for reducing the data storage requirements of virtually identical files. These data de-duplication techniques determine file segments that are identical among virtually identical files, so that the data content of each shared file segment need be stored only once for the virtually identical files. The shared data content is placed in a common storage area, and each identical segment is removed from each of the virtually identical files and replaced with a corresponding link to the shared data content.

In a file server having a redundant data elimination (RDE) store, data de-duplication is applied to a file when the file is migrated into the file server or when new data is written to the file. For example, the migration process creates a new baseline version of the file in the file server, and copies data to the baseline version from a source external to the file server. The baseline version does not share file segments with other files in the file server. Then the baseline version is space reduced by applying data de-duplication.

For example, the migration process copies the data from the source external to the file server to newly allocated extents of logical data blocks in the data storage of the file server. Then the data de-duplication process converts the baseline version into a stub version that may reference shared extents of logical data blocks in the data storage of the file server. For example, the data de-duplication process copies the inode and indirect blocks of the baseline version to create the stub version. Initially an attribute of the file is set to indicate that the de-duplication process is in progress. Then the data de-duplication process searches the RDE store for a copy of the data in each extent of the baseline version, and if a copy of the data is found in the RDE store, then the pointer in the stub version is changed to point to the extent containing the copy of the data, and a reference counter in the RDE store for the extent containing the copy is incremented. Once the data de-duplication process has been applied to all of the extents of the baseline version, the attribute of the file is set to indicate that the de-duplication process is finished, and then the stub version is substituted for the baseline version, and the original inode and indirect blocks of the baseline version are deleted, and any extents of the baseline version not shared with the stub version are deallocated.

SUMMARY OF THE INVENTION

It has been discovered that some client applications have been creating multiple copies of files in a file server having a redundant data elimination (RDE) store, and this process has been slow and wastes considerable storage space. This has been done by the client applications creating the multiple copies using the Common Internet File System (CIFS) or the Network File System (NFS) protocols, resulting in multiple baseline versions that are not space reduced. The copy creation has been slow because creation of each copy has involved reading from a space-reduced stub version and writing to a new baseline version. For "N" copies, the copy creation has required storage space equal to "N" times the storage space required by the unreduced baseline version. This storage space in a sense is wasted because the majority of it will be released when the multiple baseline copies are space reduced.

In accordance with one aspect, the invention provides a computer-implemented method of operating a file server having a redundant data elimination store. The method includes creating a baseline version of a file in the file server. The baseline version of the file includes data blocks that are in the file server and that are not shared with other files in the file server. The method then includes space reducing the file by converting the baseline version of the file to a stub version of the file. The stub version of the file includes data blocks that are in the file server and that are shared with other files in the file server. The conversion of the baseline version of the file to the stub version of the file includes replacing at least some of the data blocks that are not shared with other files in the file server with data blocks that are in the file server and that are shared with other files in the file server and that are included in the stub version of the file. The method then includes receiving a request from a client of the file server for creating at least one copy of the file, and then responding to the request from the client of the file server by creating the at least one copy of the stub version of the file so that the data blocks of the stub version of the file are shared between the stub version of the file and the at least one copy of the stub version of the file.

In accordance with another aspect, the invention provides a computer-implemented method of operating a file server having a redundant data elimination store. The method includes receiving a request from a client of the file server for creating a modified copy of a specified file. The request specifies an offset and specifies data to be included at the specified offset in the modified copy of the specified file. The method then includes responding to the request from the client of the file server by creating a copy of a stub version of the file. The stub version of the file includes data blocks that are in the file server and that are shared with the copy of the stub version of the file. The method further includes writing the specified data to the specified offset in the copy of the stub version of the file.

In accordance with a final aspect, the invention provides a file server including a network adapter for receiving requests from network clients, a redundant data elimination store for storing data blocks that are shared among files in the file server, and at least one data processor. The at least one data processor is programmed for creating a baseline version of a file in the file server. The baseline version of the file includes data blocks that are in the file server and that are not shared with other files in the file server. The method then includes space reducing the file by converting the baseline version of the file to a stub version of the file. The stub version of the file includes data blocks that are in the file server and that are shared with other files in the file server. The conversion of the baseline version of the file to the stub version of the file includes replacing at least some of the data blocks that are not shared with other files in the file server with data blocks that are in the file server and that are shared with other files in the file server and that are included in the stub version of the file. The at least one data processor is also programmed for receiving a request from one of the network clients for creating at least one copy of the file, and then responding to the request from the one of the network clients by creating the at least one copy of the stub version of the file so that the data blocks of the stub version of the file are shared between the stub version of the file and the at least one copy of the stub version of the file.

BRIEF DESCRIPTION OF THE DRAWINGS

Additional features and advantages of the invention will be described below with reference to the drawings, in which:

FIG. 6 is a block diagram of a remote procedure call to an application program interface of the file server in FIG. 1 for creating a space-reduced copy of a specified file and assigning the space-reduced copy a new file name in a specified directory;

FIG. 7 is a block diagram of a remote procedure call to an application program interface of the file server in FIG. 1 for creating a specified number of space-reduced file copies;

FIG. 9 is a block diagram of a remote procedure call for creating a modified copy of a space-reduced file in the file server of FIG. 1;

Figure 1:
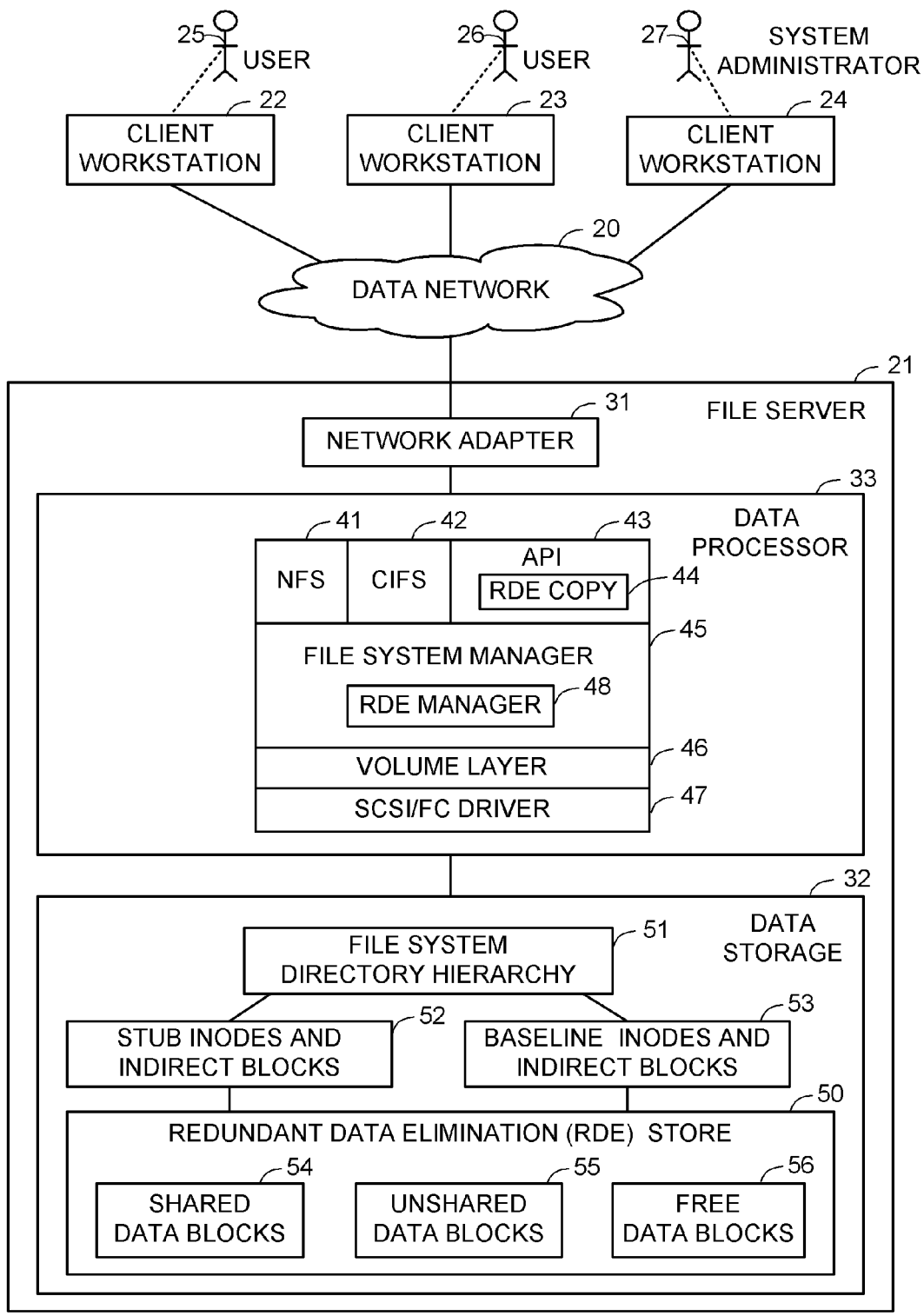
FIG. 1 is block diagram of a data processing system including a file server in accordance with the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system including a data network 20 linking a file server 21 to client workstations 22, 23, 24 operated by human users 25, 26, 27. The data network 20, for example, is an Ethernet or Internet Protocol (IP) data network. The user 27 is a system administrator responsible for configuration and maintenance of the data processing system.

The file server 21 includes a network adapter 31 linking the file server to the data network 20. The file server 21 also includes data storage 32 such as one or more disk drives. The file server 21 further includes a data processor 33 coupled to the network adapter 31 and programmed for responding to client requests for access to files in the data storage 32.

The data processor 33 is programmed with a number of program layers, including a Network File System (NFS) module 41, a Common Internet File System (CIFS) module 42, and an application program interface (API) module 43. The NFS module 41 recognizes file access commands received by the network adapter 31 from the client workstations 22, 23, 24 in accordance with the NFS protocol. The CIFS module 42 recognizes file access commands received by the network adapter 31 from the client workstations 22, 23, 24 in accordance with the CIFS protocol. For example, network clients such as UNIX (Trademark) workstations may use the Network File System (NFS) protocol to access files in the data storage 32 of the file server 21, and network clients such as Microsoft Windows (Trademark) workstations may use the Common Internet File System (CIFS) protocol to access files in the data storage 32 of the file server 21.

The application program interface (API) module 43 recognizes additional file access commands which may extend the functionality of the NFS and CIFS protocols. For example, if the NFS module 41 or the CIFS module 42 receives a file access request including an operation code that is not in accordance with the NFS or CIFS protocol, then the NFS module 41 or the CIFS module 42 will invoke the API module 43 in an attempt to execute the operation or function. The API module 43 may also respond to remote procedure calls from network clients in accordance with other network protocols, such as the Simple Network Management Protocol (SNMP) or the Hypertext Transfer Protocol (HTTP).

The data processor 33 is programmed with a file system manager 45 for managing a hierarchical file system in the data storage 32. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 45 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The data processor 33 is also programmed with a volume layer 46 for organizing the data storage 32 into logical volumes of data blocks, and a Small Computer System Interface (SCSI) or Fibre Channel (FC) driver 47 for linking the volume layer 46 to the data storage 32.

As shown in FIG. 1, the data storage 32 contains a file system directory hierarchy 51, stub inodes and indirect blocks 52, baseline inodes and indirect blocks 53, and a redundant data elimination (RDE) store 50 including shared data blocks 54, unshared data blocks 55, and free data blocks 56. Any directory of the file system is found in the file system directory hierarchy 51. A regular file of the file system (i.e., a data file that is not a directory or a special file such as a symbolic link) has an inode that is one of the stub inodes or is one of the baseline inodes 53. A regular file that has just been written or migrated into the file server and not yet space reduced consists of one of the baseline inodes 53, any number of indirect blocks linked to the baseline inode, and unshared data blocks that are linked to the baseline inode or linked to an indirect block linked to the baseline inode. A regular file that has just been space reduced consists of one of the stub inodes 52 and any number of indirect blocks linked to the stub inode, and shared or unshared data blocks that are linked to the stub inode or linked to an indirect block linked to the stub inode.

An RDE manager 48 in the file system manager 45 performs a background process of converting the baseline versions to space-reduced stub versions. This background process is further described below with reference to FIGS. 4-5. The RDE manager 48 also performs a background space reduction of new data written to a stub version, as further described below with reference to FIG. 14.

It has been discovered that some client applications have been creating multiple copies of files in a file server having a redundant data elimination (RDE) store, and this process has been slow and wastes considerable storage space. This has been done by the client applications creating the multiple copies using the Common Internet File System (CIFS) or the Network File System (NFS) protocols, resulting in multiple baseline copies that are not space reduced. For example, multiple copies of files are created in the file server 21 when the system administrator 27 configures the file server for the users 25, 26 by creating a respective copy of a VMware Corporation VMware® ESX Server (Trademark) virtual server image file in the file server 21 for use by each of the client workstations 22, 23, 24. The copy creation has been slow because creation of each copy has involved reading from the space-reduced stub version and writing to a new baseline version. For "N" copies, the copy creation has required storage space in the RDE store 50 equal to "N" times the storage space required by the unreduced baseline version. This storage space in a sense is wasted because the majority of it will be released when the multiple baseline copies are space reduced.

To reduce the storage requirements and increase the speed of creating multiple copies of space-reduced files for client applications, the application program interface (API) includes a RDE copy procedure 44 for creating multiple copies of a space-reduced file by cloning a space-reduced stub version.

Figure 2:
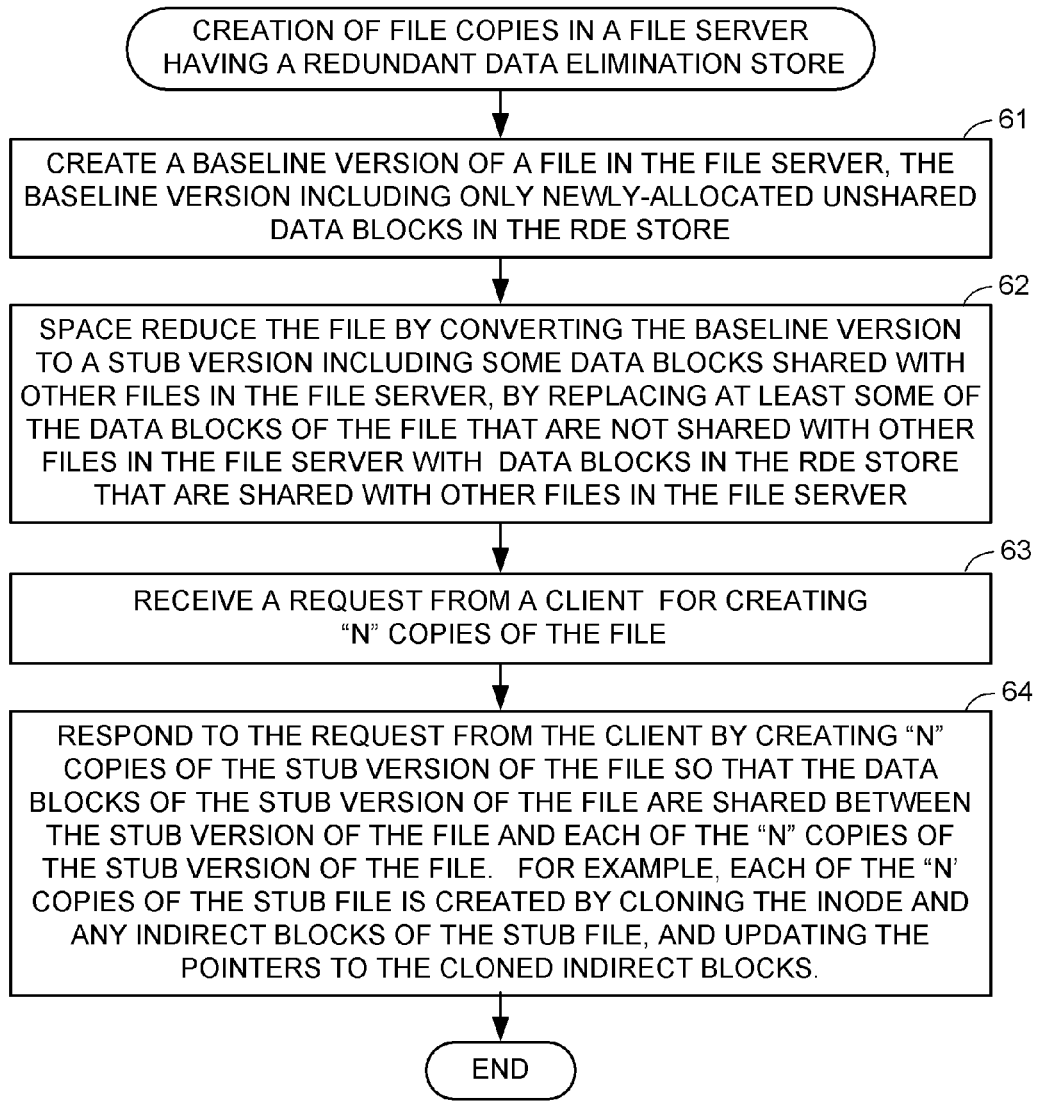
FIG. 2 is a flowchart of a method of creating file copies in the file server of FIG. 1 in accordance with a method of the present invention.

FIG. 2 shows how the RDE copy procedure 44 of FIG. 1 reduces the storage requirements and increases the speed of creating multiple copies of a space-reduced file. In a first step 61, a baseline version of the file is created, for example, by copying or migrating the file to the file server from an external source. This baseline version includes only newly allocated unshared data blocks in the RDE store. In step 62, the file is space reduced by converting the baseline version of the file to a stub version of the file. The stub version of the file includes some data blocks shared with other files in the file server. The space reduction process involves replacing some of the data blocks of the file that are not shared with other files in the file server with data blocks in the RDE store that are shared with other files in the file server. This space reduction process is described further below with reference to FIGS. 4 and 5.

In step 63, the file server receives a request from a client for creating a specified number (N) of copies of the file. In step 64, the file server responds to the request from the client by creating the specified number (N) of copies of the stub version of the file so that the data blocks of the stub version of the file are shared between the stub version of the file and each of the "N" copies of the stub version of the file. Because the data blocks of the stub version of the file are shared between the stub version of the file and each of the "N" copies of the stub version of the file, storage space is conserved in the RDE store. Each copy of the space-reduced file is created quickly by cloning the inode and any indirect blocks of the stub version of the file, and updating the pointers to the cloned indirect blocks.

Figure 3:
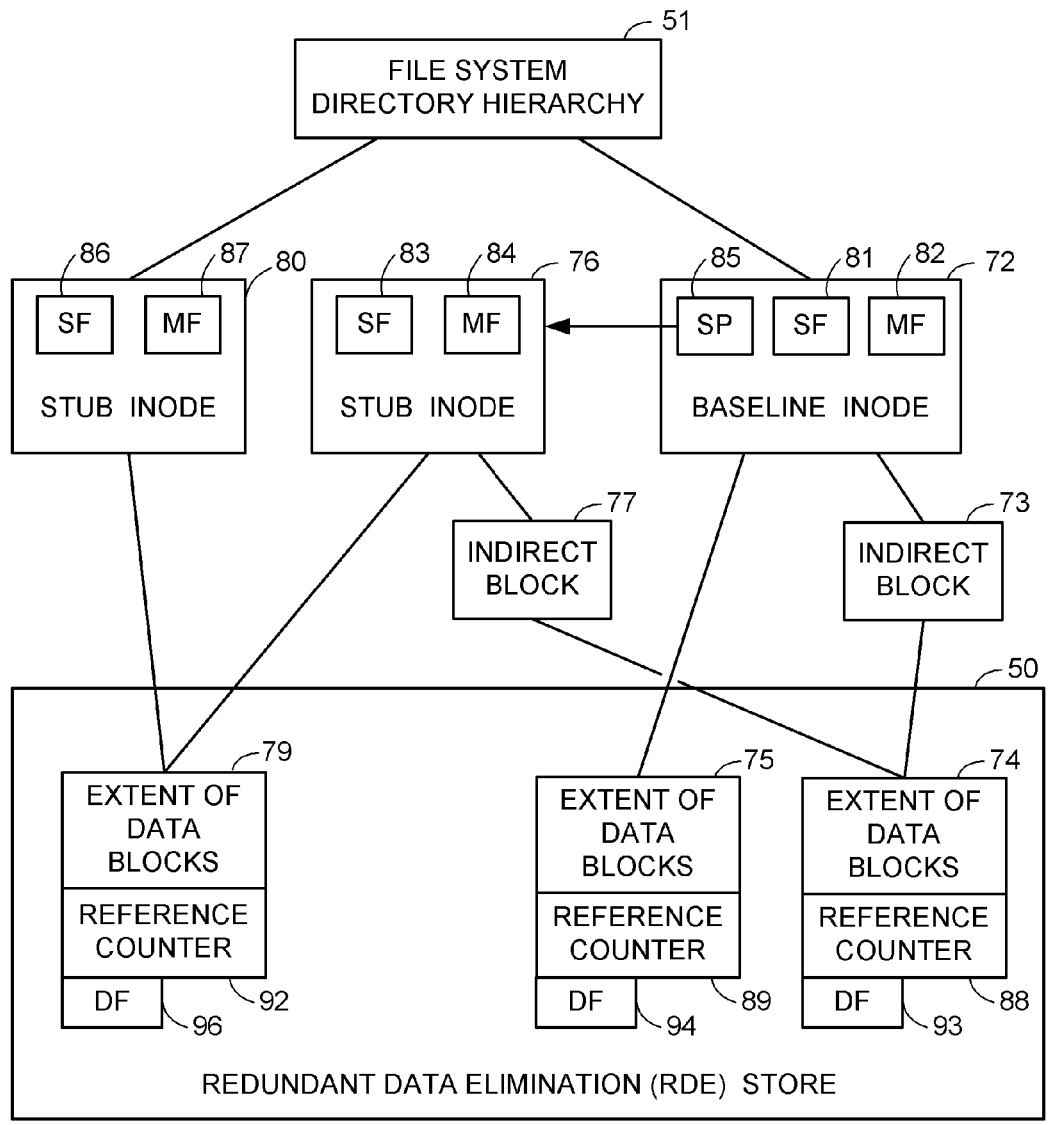
FIG. 3 is a block diagram of data structures in the data storage of the file server of FIG. 1 during the creation of file copies using the method of FIG. 2.

FIG. 3 shows data structures in the data storage of the file server of FIG. 1 during the creation of space-reduced file copies using the method of FIG. 2. The baseline version includes a baseline inode 72, an indirect block 73 linked to the baseline inode 72, an extent of data blocks 74 linked to the indirect block 73, and an extent of data blocks 75 linked to the baseline inode 72. Each extent of data blocks 74 and 75 is contained in the RDE store 50. An extent of data blocks is a series of logical data blocks stored in the data storage at contiguous logical block addresses. For example, the logical data block size is the standard disk block or disk sector size of 512 bytes, each extent of data blocks includes sixteen logical data blocks or eight kilobytes total, and each inode and each indirect block also has a size of eight kilobytes. The extents 74, 75 of the baseline version are not shared with other files in the file server.

The space reduction process involves cloning the baseline inode 72 to create a corresponding stub inode 76, and also allocating an indirect block for the stub version for each indirect block of the baseline version. This cloning of the baseline inode and allocation of indirect blocks for the stub version permits migration of the baseline version data to the stub version while preserving the internal organization of the baseline version. Therefore the baseline version can be read by an application in the usual fashion during the migration process, and there is no need for restoration of the baseline version if there is a crash or disruption of the file server during the migration process.

Each inode has a stub flag (SF) for indicating whether the inode is a baseline inode or a stub inode, and a migration flag (MF) for indicating whether the inode is read-locked for migration of file data. Thus, the baseline inode 72 has a stub flag 81 and a migration flag 82, and the stub inode 76 includes a stub flag 83 and a migration flag 84. The baseline inode 72 also has a stub pointer (SP) 85 pointing to its corresponding stub inode 76.

To begin the migration of data blocks for space reduction of the baseline version, the migration flag 82 is set to prevent an application from writing to the baseline version until the data blocks of the baseline version have been migrated to the stub version. Then, for each extent of data blocks 74, 75 in the baseline version, the stub inode 76 or an indirect block of the stub version is linked to either the extent of data blocks in the baseline version or a copy of the extent of data blocks found in the RDE store 50. In FIG. 3, for example, the data blocks in the extent 79 contain the same data as the data blocks in the extent 75.

Each extent of blocks in the RDE store may be shared among any number of stub versions. For example, the extent of data blocks 79 is linked to the stub inode 76 and is also linked to a stub inode 80 having a stub flag 86 and a migration flag 87. To indicate when each extent of data blocks is no longer shared among any of the stub versions, each extent of data blocks has a corresponding reference counter. The extent of data blocks 74 has a reference counter 88, the extent of data blocks 75 has a reference counter 89, and the extent of data blocks 79 has a reference counter 92.

For example, the reference counter indicates the number of stub versions that share the extent of data blocks. When a stub version is linked to an extent of data blocks in the RDE store, the corresponding reference counter is incremented. When a stub version is unlinked from an extent of data blocks in the RDE store, the corresponding reference counter is decremented. When the reference counter is decremented to zero, the storage of the extent of data blocks is de-allocated by putting the extent on a free extent list so that the storage becomes available for allocation for receiving new data written into the RDE store 50.

In a preferred implementation of the file server 21, the RDE store 50 may include extents that have not been de-duplicated as well as extents that have been de-duplicated. Unless the file server has experienced data corruption, if an extent in the RDE store 50 has been de-duplicated, then the de-duplicated extent should not contain the same data as any other de-duplicated extent in the RDE store. To indicate whether or not each extent in the RDE store 50 has been de-duplicated, each extent has a respective de-duplication flag (DF). For example, the extent 74 has a de-duplication flag 93, the extent 75 has a de-duplication flag 94, and the extent 79 has a de-duplication flag 96.

Figure 4:
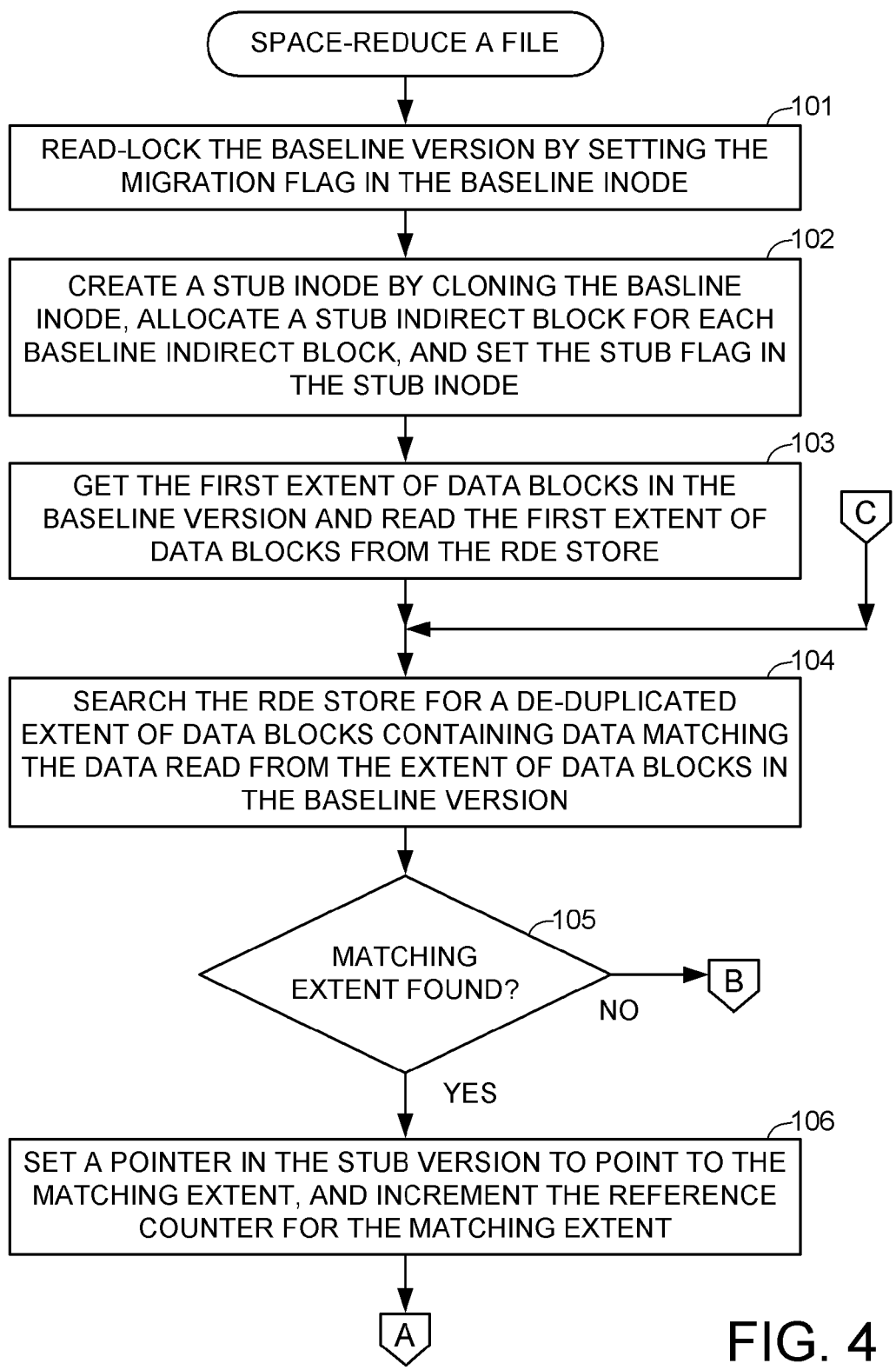
FIG. 4 and FIG. 5 together show a method of space reducing a baseline version in the file server of FIG. 1.
Figure 5:
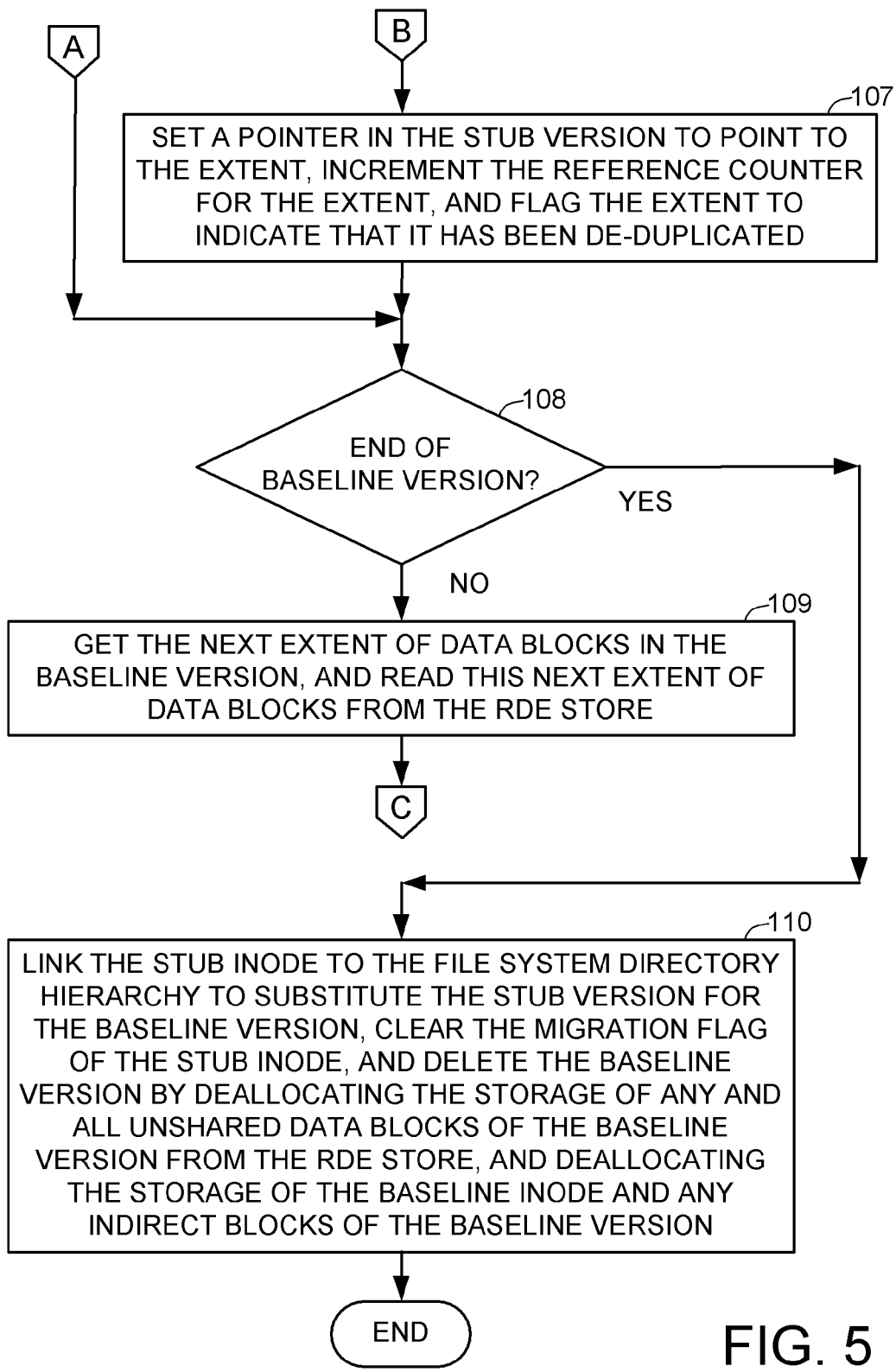

FIG. 4 and FIG. 5 show further details of the space reduction introduced in step 62 of FIG. 2. In a first step 101, the baseline version is read-locked by setting the migration flag in the baseline inode. Then in step 102, an empty stub version is created corresponding to the baseline version by cloning the baseline inode and allocating a stub version indirect block for each baseline version indirect block. In step 103, the baseline inode is read to get a pointer to the first extent of data blocks in the baseline version, and to use this pointer to read data from this first extent of data blocks in the baseline version.

In step 104, the RDE store is searched for a de-duplicated extent of data blocks containing data matching the data read from the extent of data blocks in the baseline version. In step 105, if such a matching extent is found in the RDE store, then in step 106 a pointer in the stub version (at a location in the stub inode or stub indirect block similar to the location in the baseline version of the pointer to the extent in the baseline version) is set to point to the matching extent, and the reference counter for the matching extent is incremented. Execution continues from step 106 to step 108 in FIG. 5. In step 105, if such a matching extent is not found in the RDE store, then execution branches from step 105 to step 107 of FIG. 5.

In step 107 of FIG. 5, a pointer in the stub version (at a location in the stub inode or stub indirect block similar to the location in the baseline version of the pointer to the extent in the baseline version) is set to point to the extent in the baseline version, and the reference counter for the extent is incremented, and the de-duplication flag for the extent is set to indicate that the extent has been de-duplicated. Execution continues from step 107 to step 108.

In step 108, if the end of the baseline version is not reached, then the search though the baseline inode and any baseline version indirect blocks is continued in step 109 to get a pointer to the next extent of data in the baseline version, and to read this next extent of data blocks from the RDE store. Execution loops from step 109 back to step 104 to continue the space reduction process.

In step 108, if the end of the baseline version has been reached so that the stub version is now a complete copy of the baseline version, the stub version is linked to the file system directory hierarchy to substitute the stub version for the baseline version. The migration flag of the stub version is cleared. The baseline version is deleted by deallocating the storage of any and all unshared data blocks of the baseline version from the RDE store, and deallocating the storage of the baseline inode and any indirect blocks of the baseline version. At this point, the space reduction of the baseline version has been completed.

FIG. 6 shows a format of a remote procedure call 120 of a network client to the application program interface of the file server in FIG. 1 for creating a space-reduced copy of a specified file, and assigning a specified name to the copy in a specified target directory. The remote procedure call has a field 121 containing an identification of the "user agent" or process of the client workstation that is the source of the remote procedure call 120. The API module (43 in FIG. 1) returns a reply to this "user agent". The remote procedure call 120 also has a field 122 for an identification of the server to handle the call, a field 123 for a name of the function to be invoked by the call (e.g., "RDE_COPY"), a field 124 for an identification of the source file to be copied, a field 125 for an identification of a target directory to contain the name of the copy, and a field 126 for a new file name of the copy. In a specific example, the format of the remote procedure call is similar to an NFS "create link to file" procedure. If the space-reduced copy is successfully created in the target directory, then the file server returns a file handle identifying the copy.

FIG. 7 shows a format of a remote procedure call 130 of a network client to the application program interface of the file server in FIG. 1 for creating a specified number (N) of space-reduced file copies and automatically assigning a unique name for each copy in a specified target directory. The remote procedure call has a field 131 containing an identification of the "user agent," a field 132 for an identification of the server to handle the call, a field 133 for a name of the function to be invoked by the call (e.g., "RDE_COPYN"), a field 134 for an identification of the source file to be copied, a field 135 for an identification of a target directory, and a field 136 for a value (N) specifying a desired number of copies of the file. In reply to the remote procedure call of FIG. 7, the application program interface of the file server automatically produces a unique name for each copy, for example, by appending a copy identification number from 1 to N to the name of the source file to be copied.

Figure 8:
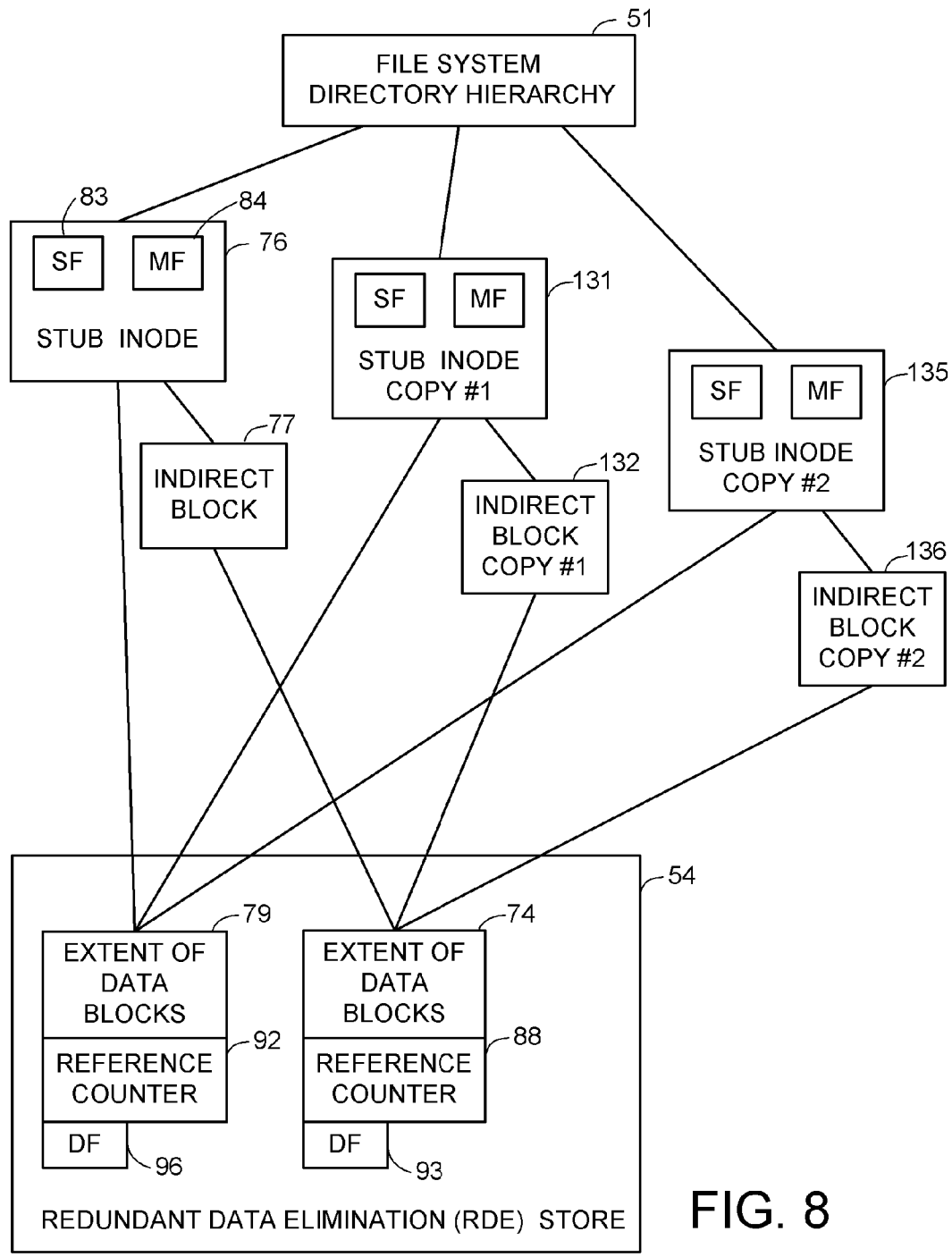
FIG. 8 is a block diagram of data structures created in the data storage of the file server of FIG. 1 when the file server responds to the remote procedure call of FIG. 7.

FIG. 8 shows data structures found in the data storage of the file server (21 in FIG. 1) when the file server responds to the remote procedure call of FIG. 7 requesting two copies of the stub version having the inode 76. In response to the remote procedure call, the stub inode 76 is cloned a first time to produce the stub inode 131 for the first copy, and the stub inode 76 is cloned a second time to produce the stub inode 135 for the second copy. Each indirect block of the stub version having the inode 76 is also cloned a first time for the first copy, and a second time for the second copy. Thus, the indirect block 77 is cloned a first time to produce the indirect block 132 for the first copy, and the indirect block 77 is cloned a second time to produce the indirect block 136 for the second copy. Then the indirect blocks of each copy are linked to the stub inode of the copy. Thus, the indirect block 132 is linked to the stub inode 131 of the first copy, and the indirect block 136 is linked to the stub inode 135 of the second copy.

The copies will have the same data content as the original stub version and the same block pointers except that the links between the stub inode of the copy and the indirect blocks of the copy and the links between indirect blocks of the copy will be different. Also each copy will have a distinct name in the file system directory hierarchy 51. For example, the name of a copy is the concatenation of the name of the original and a number identifying the copy. Thus, given a name "VSERV" for the original stub version, the first copy will have the name "VSERV1" and the second copy will have the name "VSERV2".

FIG. 9 shows a format of a remote procedure call 140 of a network client to the application program interface of the file server in FIG. 1 for creating a modified copy of a space-reduced file. The remote procedure call has a field 141 containing an identification of the "user agent," a field 142 for a server identification, a field 143 for a name of the function to be invoked by the call (e.g., "RDE_COPYW"), a field 144 for an identification of the source file to be copied, a field 145 for a target directory identification, a field 146 for a new file name, a field 147 for a value specifying an offset in the file, and a field 148 for containing an extent of new data to be written to the copy.

It would also be possible to provide additional fields for more flexibility in specifying the data to be written. For example, an additional field could be provided for specifying a certain number of extents to be written. If more than one extent would be specified, it would also be possible to include a respective field specifying a respective offset for each extent.

Figure 10:
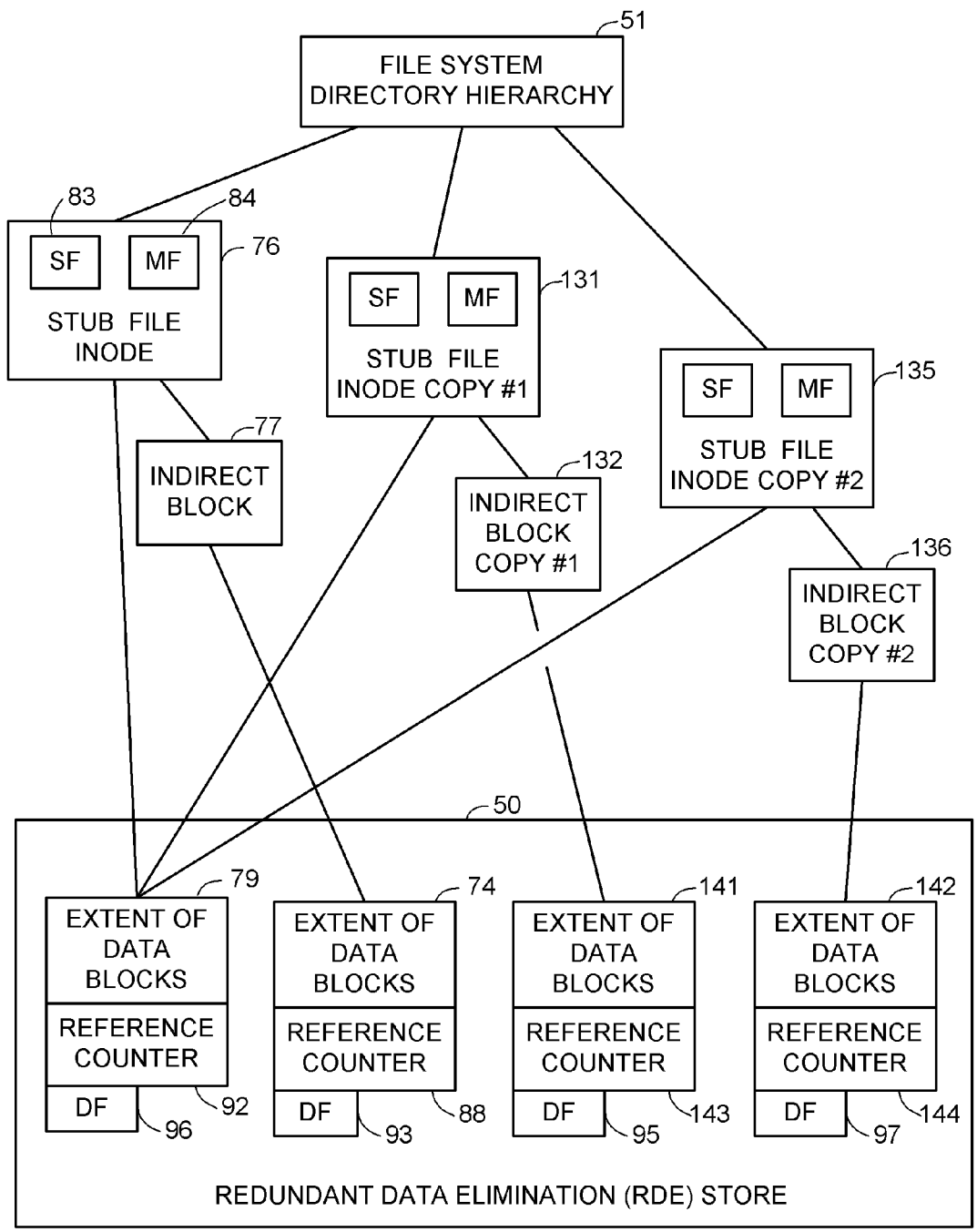
FIG. 10 is a block diagram of data structures created in the data storage of the file server of FIG. 1 when the file server responds to two remote procedure calls having the format of FIG. 9.

FIG. 10 shows data structures in the data storage of the file server (21 in FIG. 1) resulting after the file server has responded to a first remote procedure call of FIG. 9 for creating a first modified copy of the stub version having the stub inode 76 and a second remote procedure call of FIG. 9 for creating a second modified copy of the stub version having the stub inode 76.

In response to the first remote procedure call, data specified in the first remote procedure call is written to a first newly-allocated extent 141 of unshared data blocks in the RDE store 50. This first extent 141 has an associated reference counter 143 and an associated de-duplication flag 95. Then a first copy of the stub version is created by cloning the stub inode 76 to produce the stub inode 131, and cloning the indirect block 77 to produce the indirect block 132, and linking the indirect block 132 to the stub inode 131. Then the first extent 141 is written to the first copy of the stub version. In this example, the extent of data blocks 74 is at the offset in the stub version specified in the first remote procedure call, so that the first extent 141 is written to the first copy of the stub version by unlinking the extent 74 from the indirect block 132 and in its place linking the extent 141 to the indirect block 132 so as to substitute the extent 141 for the extent 74 in the first copy of the stub version.

In response to the second remote procedure call, data specified in the second remote procedure call is written to a second extent 142 of newly-allocated unshared data blocks in the RDE store 50. This second extent has an associated reference counter 144 and de-duplication flag 97. Then a second copy of the stub version is created by cloning the stub inode 76 to produce the stub inode 135, and cloning the indirect block 77 to produce the indirect block 136, and linking the indirect block 136 to the stub inode 135. Then the second extent 142 is written to the second copy of the stub version. In this example, the extent of data blocks 74 is at the offset in the stub version specified in the second remote procedure call, so that the second extent 142 is written to the second copy of the stub version by unlinking the extent 74 from the indirect block 136 and in its place linking the extent 142 to the indirect block 136 so as to substitute the extent 142 for the extent 74 in the second copy of the stub version.

Figure 11:
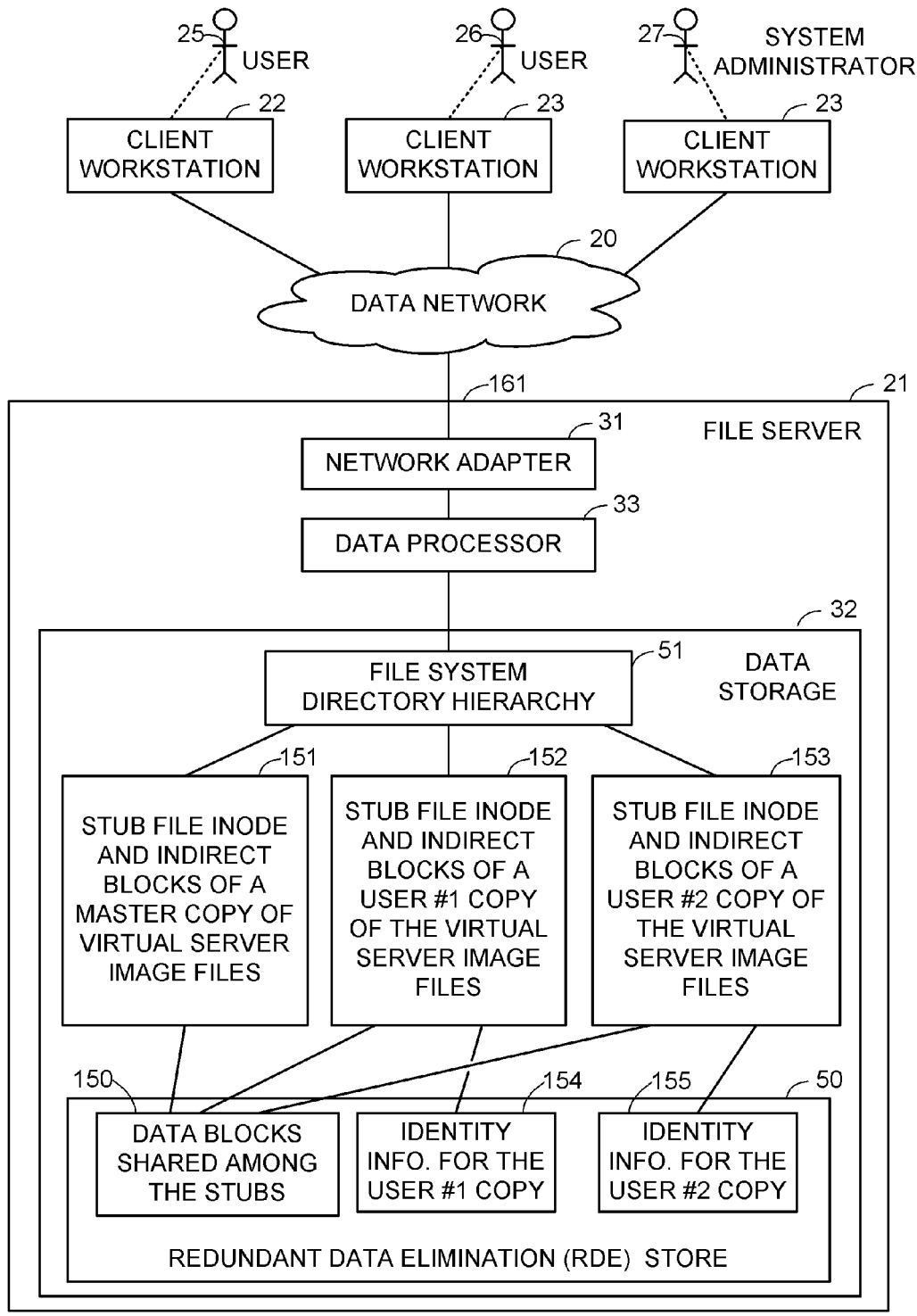
FIG. 11 is a block diagram of data structures created in the data storage of the file server of FIG. 1 when a client workstation of a system administrator uses the remote procedure call of FIG. 9 a number of times to create a respective modified copy of a virtual server image file for each of a number of client workstations.

FIG. 11 shows a more specific example of how the data structure of FIG. 10 can be used in the data processing system of FIG. 1. In this example, the original stub version (consisting of metadata blocks 151 and shared data blocks in the RDE store 50) is a master copy of a virtual server image file, such as a VMware® ESX Server (Trademark) virtual server image file.

The system administrator 27 uses the client workstation 23 to send a first remote procedure call having the format of FIG. 9 to the file server 21 requesting creation of a first modified copy of the original stub version. The first remote procedure call specifies data containing identity information for the first modified copy of the original stub version. The data processor 33 writes this specified data to a newly allocated first extent 154 in the RDE store 50. The data processor 33 then creates a first copy of the original stub version. This first copy of the original stub version consists of metadata blocks 152 and data blocks in the RDE store 50 that are shared with the original stub version. The data processor 33 then writes the identity information in the first extent 154 to the first copy of the stub version, by linking this first extent 154 to one of the metadata blocks 152 of the first copy of the stub version.

In a similar fashion, the system administrator 27 uses the client workstation 23 to send a second remote procedure call having the format of FIG. 9 to the file server 21 requesting creation of a second modified copy of the original stub version. The second remote procedure call specifies data containing identity information for the second modified copy of the original stub version. The data processor 33 writes this specified data to a newly allocated second extent 155 in the RDE store 50. The data processor 33 then creates a second copy of the original stub version. This second copy of the original stub version consists of metadata blocks 153 and data blocks in the RDE store 50 that are shared with the original stub version. The data processor 33 then writes the identity information in the second extent 155 to the second copy of the stub version, by linking this second extent 155 to one of the metadata blocks 153 of the second copy of the stub version.

In practice, once one of the users 25, 26 logs in to the operating systems of his or her workstation, execution of a virtual server application program in his or her workstation will cause additional changes to be written to the copy of the virtual server image file used by his or her workstation. These changes are initially written into newly allocated extents in the RDE store 50. Later, in a background space reduction process, as described further below with reference to FIG. 14, data de-duplication is applied to each of these newly allocated extents in the RDE store 50.

Figure 12:
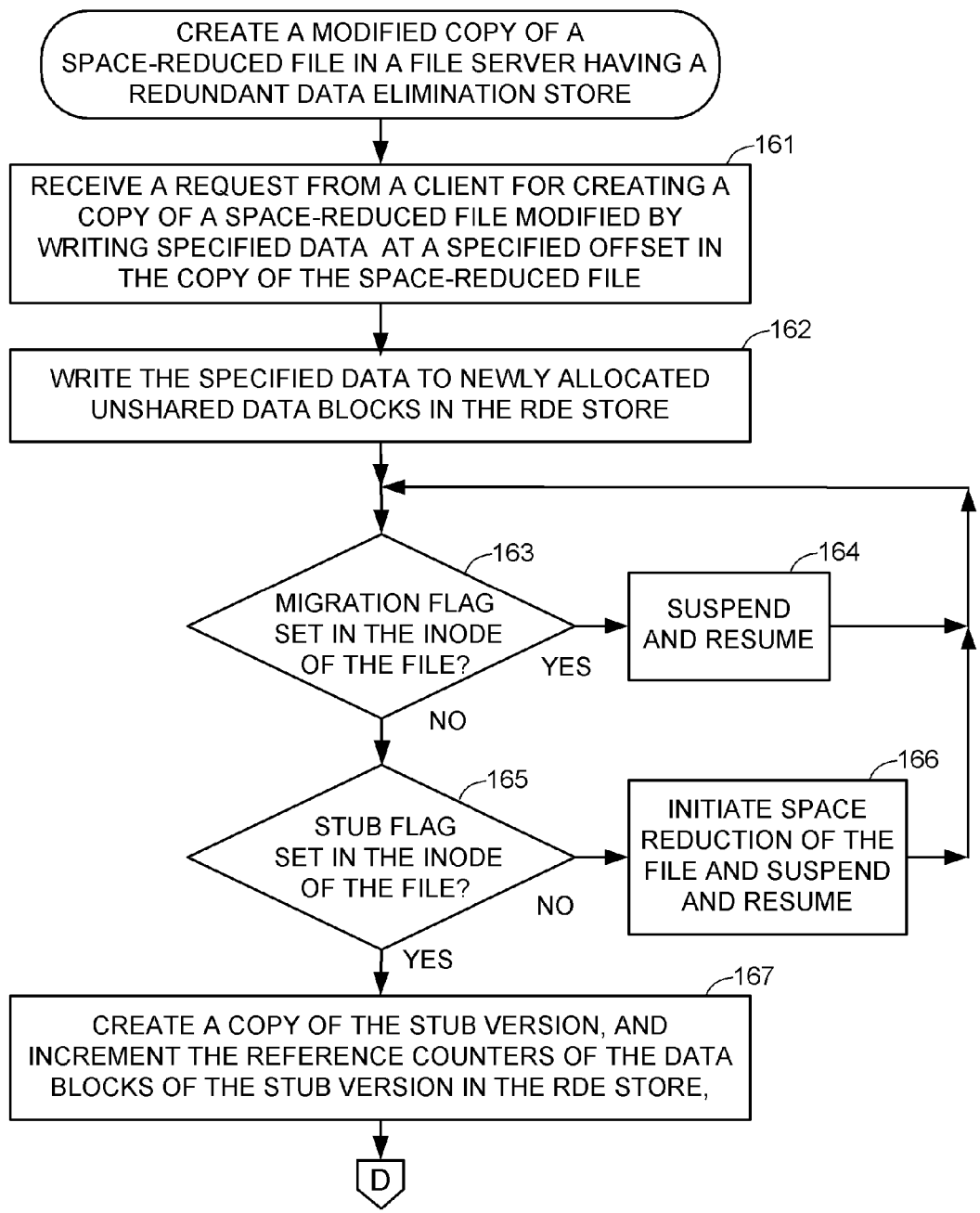
FIG. 12 and FIG. 13 together comprise a flowchart of programming of the data processor in the file server of FIG. 1 for responding to the remote procedure call of FIG. 9.
Figure 13:
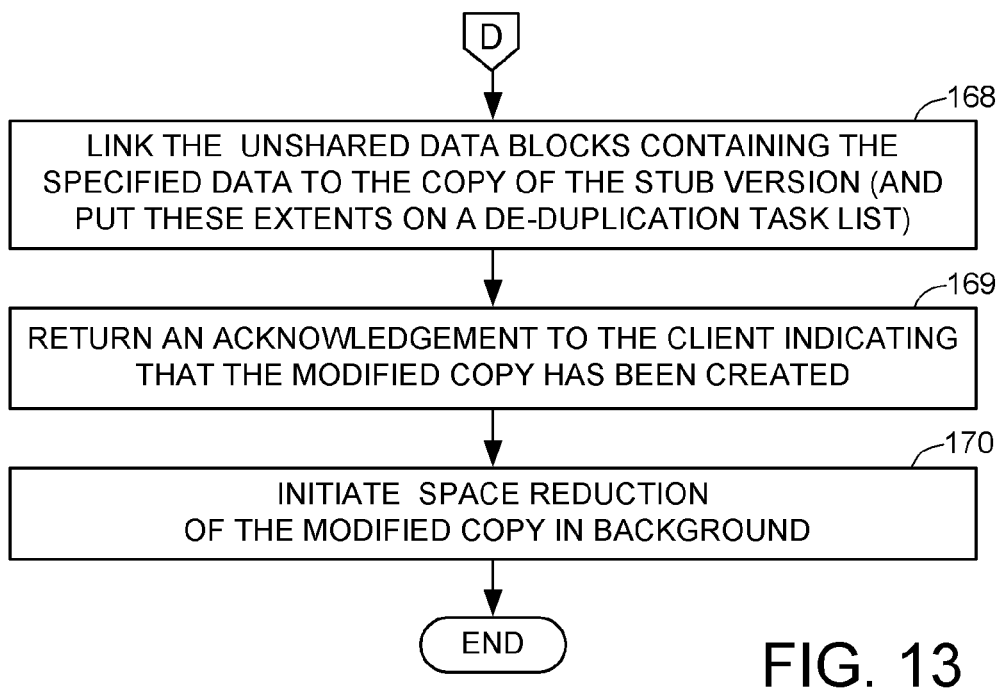

FIG. 12 and FIG. 13 show programming of the data processor in the file server of FIG. 1 for responding to the remote procedure call of FIG. 9. In a first step 161 of FIG. 12, the file server receives a request from a client for creating a copy of a space-reduced file modified by writing specified data at a specified offset in the copy of the file. In step 162, the data processor of the file server writes the specified data to newly allocated unshared data blocks in the RDE store. In step 163, if the migration flag is set in the inode of the file, then execution branches to step 164 to suspend and resume processing of the request while the file is being space reduced. When the suspended processing of the request is resumed, execution loops from step 164 back to step 163.

In step 163, if the migration flag is not found to be set in the inode of the file, then execution continues from step 163 to step 165. In step 165, if the stub flag is not set in the inode of the file, then execution branches from step 165 to step 166. In step 166, the data processor initiates space reduction of the file, and suspends processing of the request for a time while the file is being space reduced, and later resumes execution of processing of the request. Execution loops from step 166 back to step 163.

In step 165, when the stub flag is found to be set in the inode of the file, execution continues from step 165 to step 167. In step 167, the data processor creates a copy of the corresponding stub version, and increments the reference counters of the data blocks of the corresponding stub version in the RDE store. Execution continues from step 167 to step 168 of FIG. 13.

In step 168 of FIG. 13, the data processor links the unshared data blocks containing the specified data to the copy of the corresponding stub version. Once an unshared data block containing the specified data has been linked to the corresponding stub version, it may be placed on a de-duplication task list. For example, an entry on such a de-duplication task list includes an inode or indirect block number and an offset in the inode or indirect block of the pointer to the not-yet de-duplicated unshared data block containing the specified data. In step 169, the file server returns an acknowledgement to the client indicating that the modified copy has been created. Then in step 170, the data processor initiates a background process of space reduction of the modified copy of the corresponding stub version. This space reduction process, as further described below with reference to FIG. 14, applies data de-duplication, as further described below with reference to FIG. 15, to the extents in the modified copy that have not been de-duplicated.

Figure 14:
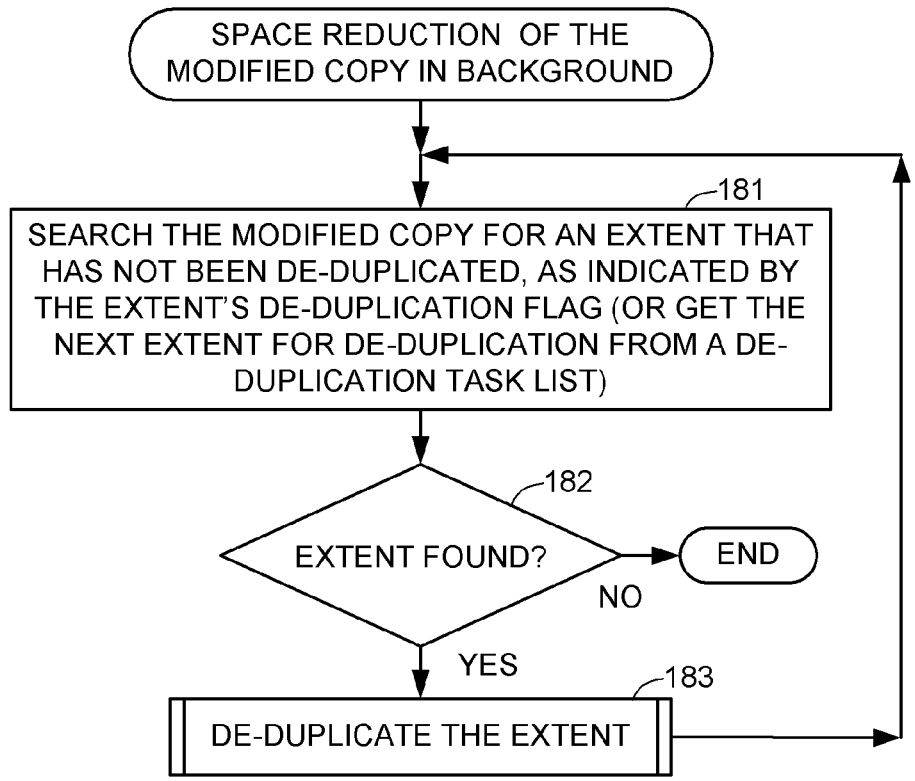
FIG. 14 is a flowchart of programming of the data processor in the file server of FIG. 1 for space reduction of a modified copy.

FIG. 14 shows the space reduction of the modified copy in background. In a first step 181, the data processor of the file server gets a next not-yet de-duplicated extent of the modified copy. For example, the inode and indirect blocks of the modified copy are searched for an extent that has not yet been de-duplicated, as indicated by the extent's de-duplication flag, or else the next not-yet de-duplicated extent is obtained from the de-duplication task list introduced above with respect to step 168 of FIG. 13. In step 182, if such a not-yet de-duplicated extent is not found, then the background process is finished for the modified copy. Otherwise, if a not-yet de-duplicated extent is found, then execution continues from step 182 to step 183. In step 183, de-duplication of the extent is performed by calling a subroutine, which is further described below with reference to FIG. 15. Upon return from the subroutine, execution loops back to step 181.

Figure 15:
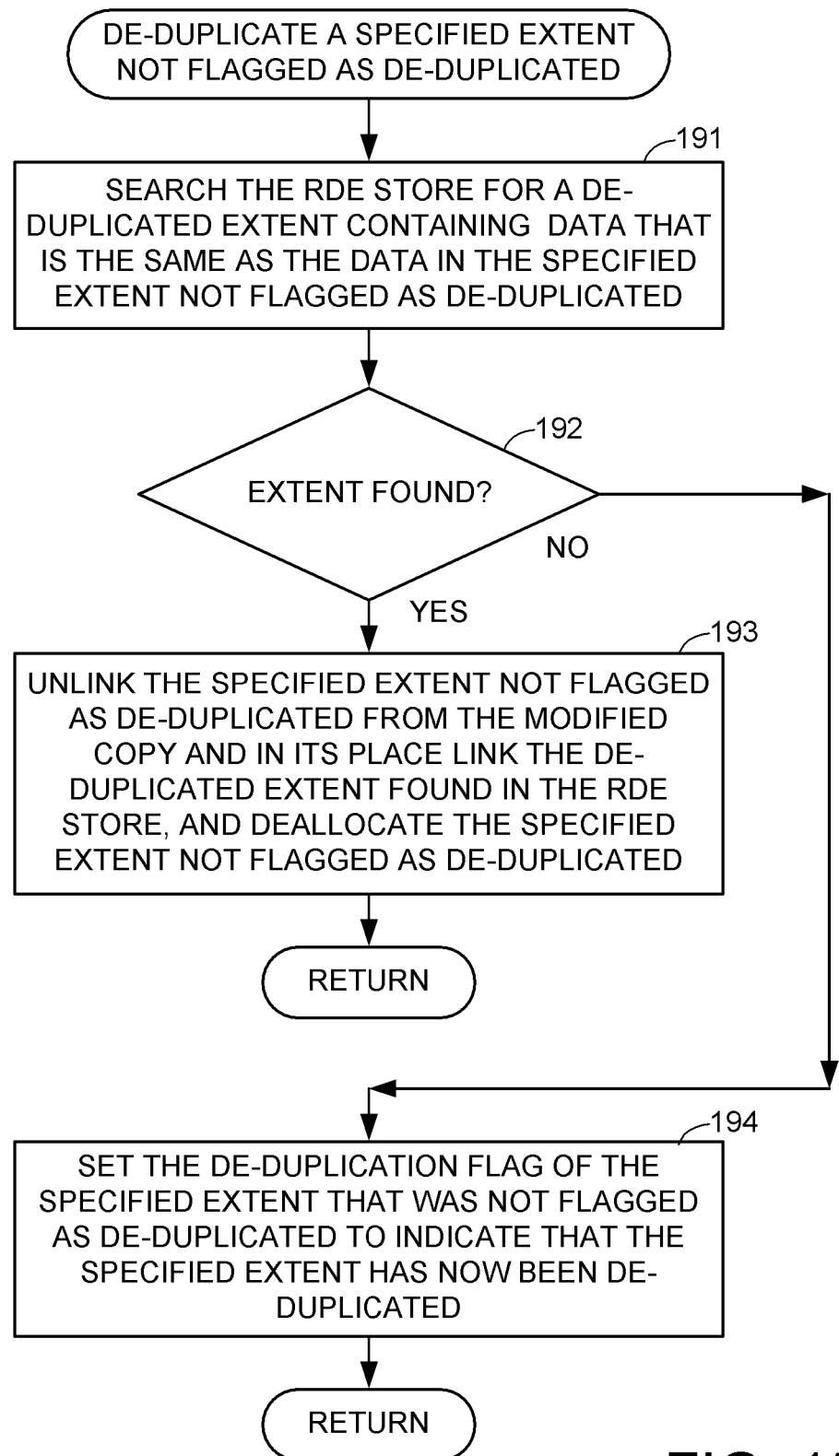
FIG. 15 is a flowchart of a subroutine for de-duplicating a specified extent.

FIG. 15 shows the de-duplication subroutine (called in step 183 of FIG. 14) for de-duplicating a specified extent that is not flagged as de-duplicated. In a first step 191 of FIG. 15, the RDE store is searched for a de-duplicated extent containing data that is the same as the data in the specified extent not flagged as de-duplicated. In step 192, if such an extent is found, then execution continues to step 193. In step 193, the specified extent not flagged as de-duplicated is unlinked from the modified copy, and in its place, the de-duplicated extent found in the RDE store is linked to the modified copy. After step 193, execution returns.

In step 192, if such an extent is not found, then execution branches to step 194. In step 194, the de-duplication flag of the specified extent that was not flagged as de-duplicated is set to indicate that the specified extent has now been de-duplicated. After step 194, execution returns.

In view of the above, there has been described a file server having a redundant data elimination store and an application program interface (API) responding to requests from clients for copies of space-reduced files. For reduced storage requirements and reduced processing time, a baseline version of a file is space reduced before it is copied. The data blocks of the baseline version are not shared among files in the file server. The baseline version is space reduced by conversion to a stub version including some data blocks that are shared among the files in the file server. The file server response to a request from a client for creation of one or more space-reduced copies by cloning the stub version. The file server may also respond to a request for creation of a modified space-reduced copy having specified data written at a specified offset. In this case, the file server responds by writing the specified data to newly allocated data blocks, cloning the stub version, and then linking the newly allocated data blocks to the copy of the stub version in order to write the specified data to the specified offset in the space-reduced copy. The modified space-reduced copy can later be space reduced in a background process that de-duplicates extents of the data blocks containing the specified data.

Requests for copies of space-reduced files can be used in a variety of applications. For example, a client workstation of a system administrator may request the file server to create a respective modified copy of a virtual server image file for use by each client of the file server. In this case, the specified data for each copy includes identity information identifying each copy. In a similar fashion, a client may request the file server to create a modified copy of a computer program in order to apply a "patch" to the program. In this case, the specified data is the "patch" to the program.

Another application is concatenation of space-reduced files. For example, to concatenate two files, a space-reduced copy is made of each of the two files. Then the data block pointers from the inode and any indirect blocks of the file copy to be appended are incorporated into the metadata of the other file copy.

What is claimed is:

1. A computer-implemented method of operating a file server having a redundant data elimination store, said method comprising:
  (a) creating a baseline version of a file in the file server, the baseline version of the file including data blocks that are in the file server and that are not shared with other files in the file server; and then
  (b) space reducing the file by converting the baseline version of the file to a stub version of the file, the stub version of the file being contained in the file server and including data blocks that are in the file server and that are shared with other files in the file server, wherein the conversion of the baseline version of the file to the stub version of the file includes replacing at least some of the data blocks that are not shared with other files in the file server with data blocks that are in the file server and that are shared with other files in the file server and that are included in the stub version of the file; and then
  (c) receiving a request from a client of the file server for creating at least one copy of the file; and then
  (d) responding to the request from the client of the file server by creating in said file server at least one copy of the stub version of the file so that the data blocks of the stub version of the file are shared between the stub version of the file and said at least one copy of the stub version of the file;

wherein the request from the client of the file server specifies a certain number of multiple copies, and wherein the method includes further responding to the request from the client of the file server by creating in the file server the certain number of multiple copies of the stub version of the file so that the data blocks of the stub version of the file are shared between the stub version of the file and each of the multiple copies of the stub version of the file.

2. A computer-implemented method of operating a file server having a redundant data elimination store, said method comprising:

(a) creating a baseline version of a file in the file server, the baseline version of the file including data blocks that are in the file server and that are not shared with other files in the file server; and then (b) space reducing the file by converting the baseline version of the file to a stub version of the file, the stub version of the file being contained in the file server and including data blocks that are in the file server and that are shared with other files in the file server, wherein the conversion of the baseline version of the file to the stub version of the file includes replacing at least some of the data blocks that are not shared with other files in the file server with data blocks that are in the file server and that are shared with other files in the file server and that are included in the stub version of the file; and then (c) receiving a request from a client of the file server for creating at least one copy of the file; and then (d) responding to the request from the client of the file server by creating in said file server at least one copy of the stub version of the file so that the data blocks of the stub version of the file are shared between the stub version of the file and said at least one copy of the stub version of the file;

wherein the file server is included in a data processing system including a workstation of a system administrator and workstations of users, the client of the file server is the workstation of a system administrator, and the request is a request for creating a copy of a virtual server image file for the workstation of one of the users.

3. The computer-implemented method as claimed in claim 2, wherein the request from the client of the file server specifies an offset and specifies data, and wherein the method includes further responding to the request from the client of the file server by writing the specified data to the specified offset in said at least one copy of the stub version of the file, and the specified data is identity information for identifying the copy of the virtual server image file for the workstation of one of the users.

4. A computer-implemented method of operating a file server having a redundant data elimination store, said method comprising:

(a) receiving a request from a client of the file server for creating a modified copy of a specified file, the request specifying an offset and specifying data to be included at the specified offset in the modified copy of the specified file; and (b) responding to the request from the client of the file server by creating a copy of a stub version of the file, the stub version of the file including data blocks that are in the file server and that are shared with the copy of the stub version of the file, and writing the specified data to the specified offset in the copy of the stub version of the file.

5. The computer-implemented method as claimed in claim 4, which further includes the file server maintaining reference counters indicating when the data blocks in the redundant data elimination store are no longer shared with any other file in the file server.

6. The computer-implemented method as claimed in claim 5, wherein the file server is included in a data processing system including a workstation of a system administrator and workstations of multiple users, the client is the workstation of a system administrator, the request is a request for creating a copy of a virtual server image file for the workstation of one of the users, and the specified data is identity information for identifying the copy of the virtual server image file for the workstation of one of the users.

7. The computer-implemented method as claimed in claim 4, which includes further responding to the request from the client of the file server by linking the specified data to the copy of the stub version of the specified file, and then searching the redundant data elimination store for a copy of the specified data, and upon finding that the redundant data elimination store contains a copy of the specified data, unlinking the specified data from the copy of the stub version of the specified file and linking the copy of the specified data in the redundant data elimination store to the copy of the stub version of the specified file.

8. A file server comprising:

a network adapter for receiving requests from network clients;

a redundant data elimination store for storing data blocks that are shared among files in the file server; and at least one data processor programmed for creating a baseline version of a file in the file server, the baseline version of the file including data blocks that are in the file server and that are not shared with other files in the file server, and then space reducing the file by converting the baseline version of the file to a stub version of the file, the stub version of the file being contained in the file server and including data blocks that are in the file server and that are shared with other files in the file server, wherein the conversion of the baseline version of the file to the stub version of the file includes replacing at least some of the data blocks that are not shared with other files in the file server with data blocks that are in the file server and that are shared with other files in the file server and that are included in the stub version of the file;

wherein said at least one data processor is also programmed for receiving a request from one of the network clients for creating at least one copy of the file, and then responding to the request from said one of the network clients by creating in said file server at least one copy of the stub version of the file so that the data blocks of the stub version of the file are shared between the stub version of the file and said at least one copy of the stub version of the file; and wherein the request from said one of the network clients specifies a certain number of multiple copies, and wherein said at least one data processor is programmed for further responding to the request from said one of the network clients by creating in the file server the certain number of multiple copies of the stub version of the file, and each of the multiple copies of the stub version of the file shares the data blocks that are included in the stub version of the file.

9. A file server comprising:

a network adapter for receiving requests from network clients;

a redundant data elimination store for storing data blocks that are shared among files in the file server; and at least one data processor programmed for creating a baseline version of a file in the file server, the baseline version of the file including data blocks that are in the file server and that are not shared with other files in the file server, and then space reducing the file by converting the baseline version of the file to a stub version of the file, the stub version of the file being contained in the file server and including data blocks that are in the file server and that are shared with other files in the file server, wherein the conversion of the baseline version of the file to the stub version of the file includes replacing at least some of the data blocks that are not shared with other files in the file server with data blocks that are in the file server and that are shared with other files in the file server and that are included in the stub version of the file;

wherein said at least one data processor is also programmed for receiving a request from one of the network clients for creating at least one copy of the file, and then responding to the request from said one of the network clients by creating in said file server at least one copy of the stub version of the file so that the data blocks of the stub version of the file are shared between the stub version of the file and said at least one copy of the stub version of the file;

wherein the request from said one of the network clients specifies an offset and specifies data, and wherein said at least one data processor is programmed for responding to the request from said one of the network clients by writing the specified data to said at least one copy of the stub version of the file to produce a modified copy of the stub version of the file containing the specified data at the specified offset; and wherein the request is a request for creating a copy of a virtual server image file for a particular client of the file server, and the specified data is identity information identifying the copy of the virtual server image file for the particular client of the file server.

* * * * *